Oct. 12, 1965   J. P. MILLER   3,211,312
MACHINE FOR HANDLING CLASSIFIABLE MATERIALS
Filed March 19, 1964   3 Sheets-Sheet 1
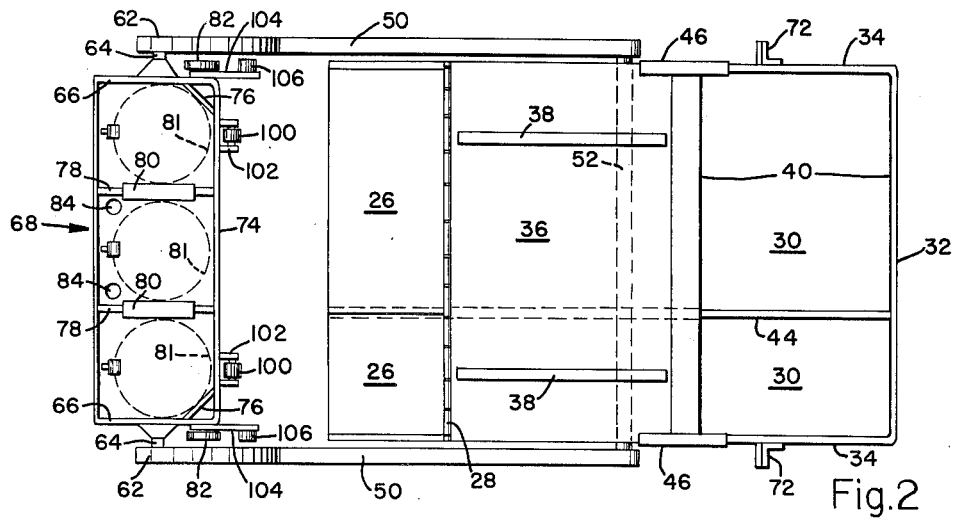
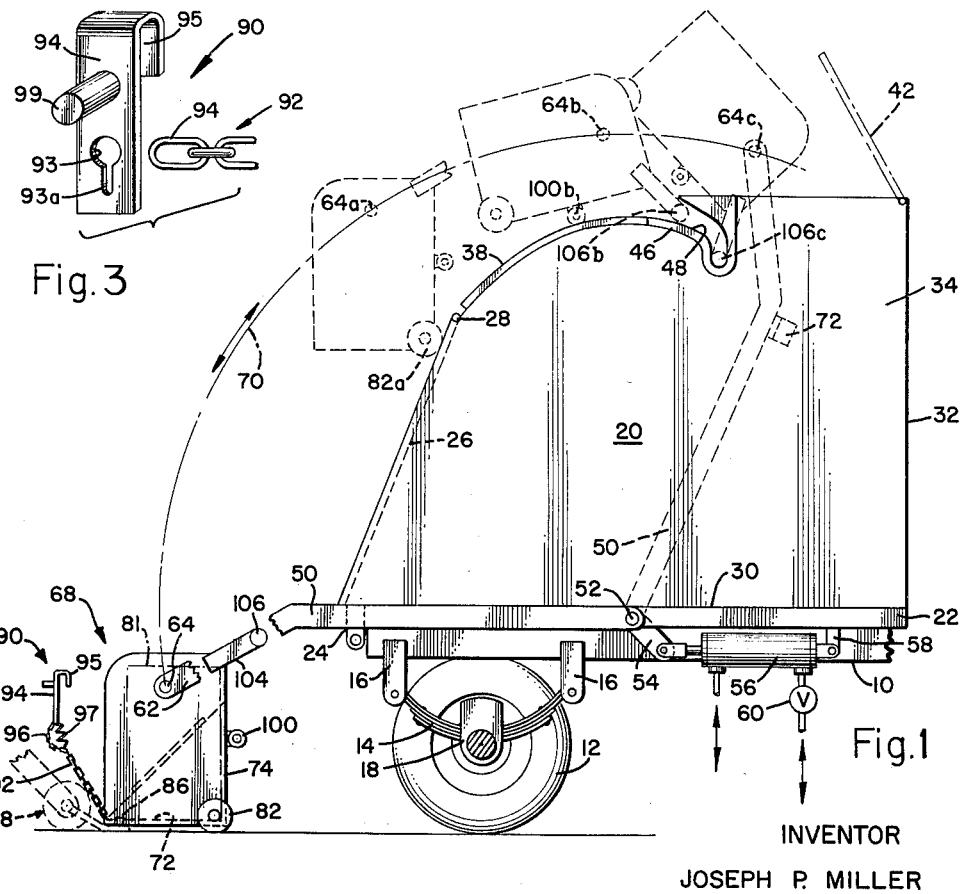
INVENTOR
JOSEPH P. MILLER Oct. 12, 1965    J. P. MILLER    3,211,312
MACHINE FOR HANDLING CLASSIFIABLE MATERIALS
Filed March 19, 1964    3 Sheets-Sheet 3

INVENTOR,
JOSEPH P. MILLER
BY
AGENT

United States Patent Office 3,211,312
Patented Oct. 12, 1965

3,211,312
MACHINE FOR HANDLING CLASSIFIABLE
MATERIALS
Joseph P. Miller, 500 McKinley Ave., Kewanee, Ill.
Filed Mar. 19, 1964, Ser. No. 353,223
5 Claims. (Cl. 214—302)

This invention is a continuation-in-part of my prior application S.N. 276,109, now abandoned, and relates to portable machinery and method for handling classifiable materials; and more particularly to truck chassis mounted, compartmented dump type portable tanks, that are particularly suited for being loaded with and transporting materials of different classes or kinds from one or more loading stations, to one or more unloading stations. The invention includes new loading mechanism and method of using same.

As one particular example of handling of different kinds of materials, and not in a limiting sense, such a tank may be provided with two or more longitudinally and/or transversely arranged compartments. At the end of each compartment there is a door that is opened when the truck is tilted up at its front end to dump the contents of the compartment out the rear thereof. Different compartments may contain different materials such as steel chips, brass chips, aluminum chips or the like, from a machine shop, for example. Depending on several factors such as size and shape of chips, compactness of same, etc., these materials will have various ratios of weight to volume. Accordingly, if each compartment is filled to the same volume as the other compartment, or compartments, there can be substantial off-centering of the total load transverse with relationship to the chassis. This is referred to hereinbelow as an eccentric load.

Such eccentric loads can severely overload the springs on one side of the chassis, which can in turn eccentrically stress the tank. However, still a further aggravated stressed condition can obtain when the heavy compartment is dumped. The tank is usually dumped tilted to about a forty-five degree angle about pivots adjacent its bottom rear corner. The center-of-gravity of such a tank may be approximately one-half the distance from these pivots to the top front corner of the tank. This structural relationship establishes a moment arm of substantial length about the pivots, and such tanks are quite massive. Hence when the heavy eccentric load is released, the chassis springs on the heavily loaded side releases the potential energy therein suddenly, and torsional forces of high order are created suddenly in the tank structure. This action can destroy tanks unless they be inordinately strong for the purpose intended, that is, loading, transporting, and unloading materials of various classes or kinds.

In addition, the invention to be described in detail is particularly adapted to handle portable containers made of different materials, and of different sizes and shapes. A portable elevator, or platform, is used in combination with these portable containers in a manner to be described more fully below. Both the portable elevator and containers can be conveniently placed at pick up stations served by a dump-tank truck that empties the containers into its tank by well known means, but preferably by dumping the containers into a top opening in the tank. In the use of this invention, a convenient method of classifying and sub-classifying materials is afforded. The tank can be partitioned to maintain such classification and to provide additional strength to the tank by compacting of certain materials.

The portable containers used in this invention can be conventional or of special construction. The machine accommodates many kinds with facility. Conventional containers can be of metal, wood, or paperboard, commonly referred to as drums. Special containers, particularly for food processing, are found to be at least expensive when fabricated of plastics. Usually, but not essentially, the drums are round in plan-form and have about nine cubic feet capacity. Depending on the material handled by such capacity, the weight of material in a drum can range from a few hundred pounds to over a ton.

Several presently used drum loaders provide skids and clamps that fasten to the lips of drums. With heavy materials such loaders cannot be used with several kinds of the least expensive drums. The clamp mechanisms tend to break such drums and render them useless; and fail to accomplish loading. While plastics and paper containers appear best and least expensive for certain materials, they cannot be used with such presently known loaders for these reasons.

Accordingly, it is a broad object of this invention to provide an improved mechanism for classifying and loading materials of different classifications.

Another broad object of this invention is to provide an improved method for classifying and loading materials of different kinds and classifications.

Another broad object of this invention is to provide an improved machine including container handling mechanism for loading, transporting, and unloading materials of differet classes or kinds.

Another broad object of this invention is to provide an improved method for classifying, loading, transporting, and unloading machines of the character set forth in the object immediately above.

The foregoing objects, and more specific objects and advantages of the invention will be either obvious or pointed out in the following claims and specifications.

In the drawings:

FIGS. 1 and 2 are diagrammatic orthographically projected side and top views respectively of a presently preferred form of the invention;

FIG. 3 is a perspective detail view of an anchor used in the invention;

Figure 4:
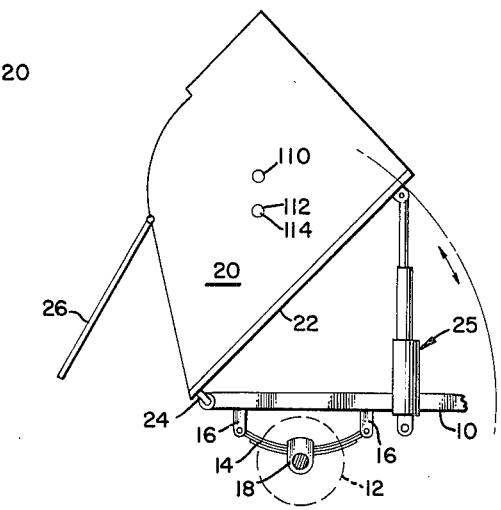

Referring more in detail to the drawings, and first to FIGS. 1, 2 and 4; a truck chassis 10 is connected to rear drive wheels 12 through conventional springs 14 connected to chassis brackets 16 and a rear axle housing 18. A tiltable rear dump type tank 20 is mounted on beams 22, which at their rear ends have depending brackets for pivotally connecting the tank 20 to the rear end of the chassis 10 to provide for tilting of the tank to the position indicated in FIG. 4 for dumping same, in well known manner. A telescoping hydraulic motor 25 with conventional controls, or other known means, can be utilized for this purpose. It is to be noted, however, that it is preferred to compact certain materials in this invention by tilting the tank with the rear dumping doors 26 closed. Such operation will be described more fully below.

The dumping doors 26 are mounted on upper hinges 28 and are arranged to close the rear end of the tank 20. Suitable latch means, not shown, can latch the doors closed adjacent the bottom edges thereof. When unlatched, the doors 26 may be swung out as indicated in FIG. 4 by hand, automatically, or under force of material being discharged. The balance of the tank comprises a floor 30, a front wall 32, side walls 34, a top 36 provided with rails 38, a top loading opening 40 that may have an optional door 42 if desired, and a longitudinal vertical partition 44 that divides the tank shown into two compartments, one of which has approximately twice the volumetric capacity of the other. The location of this partition can vary depending on the classification and/or characteristics of materials to be handled. There can be two, or more, partitions within the scope of the invention to attain the function to be described in more detail below.

Inasmuch as this invention has advantages for handling heavy materials, preferably cast inserts 46 forming dumping cam profiles 48 are provided. The metal used in the castings 46 should have toughness and abrasion resistance, such as is present in carbon steel and several of the casting alloys of aluminum, for example. It is also preferable that these inserts be weldable by conventional techniques to the sides 34 which are usually made of steel or aluminum.

Materials are loaded in the tank by elevating arms 50 that are secured to ends of a shaft 52 journalled in the beams 22 to form pivot points. A crank arm 54 is secured to the shaft 52 and rocked by suitable means, such as an hydraulic motor 56 pivotally connected to a bracket 58 secured to the beams 22. A control valve 60 is provided for operating the hydraulic motor 56. Distal ends 62 may be of a split bearing of any well known kind that can be opened or clamped to secure pivots 64 attached to sides 66 of an elevator platform generally indicated at 68. The platform 68 is elevated bodily by the arms 50 and the pivots 64 will follow an arc 70 through positions 64a and 64b to the position 64c wherein rotation of the arms 50 and platform 68 are stopped when the arms engage stops 72 secured to the sides 34 of the tank 20.

In addition to the sides 66, the platform 68 includes a bottom 72, back plate 74, vertical strengthening gussets 76 and transverse strengthening partitions 78, which latter are preferably reinforced with plates 80 which serve the additional function of properly spacing containers handled by the platform 68. A pair of wheels 82 are provided adjacent the bottom rear corners of the platform 68 and serve the dual function of rolling up the edges of the tank in the position 82a to prevent damage to tank parts, and also as wheels for transporting the platform 68 on the ground or floor. Holes 84 are provided in the bottom 72 adjacent the front thereof to receive a pivot nose 86 on a conventional dolly 88, or the like, which can be employed to move the entire platform from station to station for receiving containers 82, or the like.

FIG. 3 shows a detail of an anchor 90 that is adapted to accommodate containers of different sizes, particularly in height. A link chain 92 is secured at its bottom end to the bottom 72 of the platform 68 adjacent the front edge thereof. The top end 94 of the chain 92 is inserted through a hole 93 and down into a slot 93a in a leg 94 of an inverted J-hook having an anchoring leg 95 for fitting over the top lip of a container 82. A bight 96 is formed by securing a spring 97 between spaced apart links of the chain 92. This bight is sufficiently larger as determined by the link in the slot 93a to permit the leg 95 to pass easily over the lip of a container, and the spring 97 keeps the J-hook in place. The anchor 90 secures the container on the platform 68 in dumping position over the opening in the top of the tank, but permits limited movement to the extent of the length of the bight 96, and then a sudden stop, to cause contents of the containers to leave same more thoroughly. A handle 99 is provided for ease of use of the anchor.

The platform 68 is also provided with secondary rotating mechanism. A pair of rollers 100 are journalled in brackets 102 secured to the back 74 of the platform 68.

The rollers 100 are aligned to engage the tracks 38 and travel along same as shown at 100b. Adjacent the upper rear corners of the platform 68 are a pair of arms 104 pivotally carrying a pair of rollers 106 which are aligned to engage the cam profiles 48 of the inserts 46 as in the positions 106b and 106c, in which latter position the materials in the containers 82 is dumped.

It is to be noted that the mechanism described above provides a desirable method for handling classified materials most expeditiously. As an example, and not in a limiting sense, the containers 82 can be of relatively fragile and inexpensive material, such as paper and plastic. The destructive forces on same, at several stations, can be maintained at a minimum. In loading on the platform 68 they can be slid on, or fork-truck placed. On the platform 68 the elevating and rotation forces are absorbed in the structure of the platform. In the dumping position, the lips of containers 82 are subjected only to the restraint of the J-hook 90 and partially to the friction of the material contained therein. The balance of the friction is absorbed by the side of the container contacting the back plate 74 of the platform 68. Accordingly, the usefulness of containers is increased appreciably, and initial and upkeep expenditure kept to a practicable minimum.

In addition to the above, a desirable method for prolonging tank and truck utility is provided. Because the kinds of materials handled is numerous, including metal chips, food items, tankage, refuse, garbage, and mixtures of several sorts, some being readily compactible and others not, only one specific example will be set forth. Other uses reside within the ken of those engaged in material handling and should be obvious to those skilled in the art.

Figure 5:
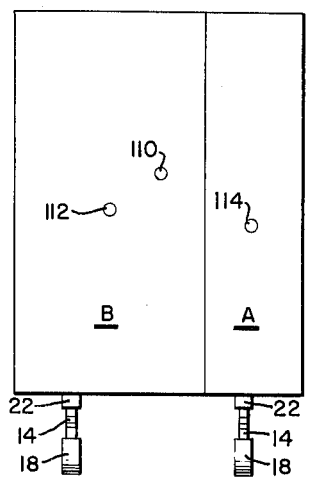
FIGS. 4 and 5 are orthographically projected diagrams to illustrate force factors present in the invention.

As an example, a factory may have steel chips that are not readily compactible in about double the volume of brass chips that are relatively compactible. Referring to FIG. 5, the brass chips would be placed in the right-hand smaller compartment A and the steel chips in the left-hand larger compartment B. Such chips could be picked up conveniently at several stations in the factory by platforms 68. One brass container would be placed on the right side of the platform 68 and two steel containers would be placed at the center and left side of the platform. The platform can be moved to the tank truck or vice versa, and the material elevated and loaded thereinto. After a few of such loading operations the tank 20, with the doors 26 closed, can be tilted as in FIG. 4 to cause the material to move to the rear. Successive tiltings of the tank 20 will cause substantial compacting of the brass chips, and accordingly the weight to volume ratio may become greater in the smaller compartment A.

It is desirable that the weight of the load be as near the centerline of the truck as feasible to prevent eccentric loading. The above method provides such loading. In FIG. 4 and FIG. 5, the center of gravity of the tank is indicated at 110, the center of gravity of the steel chips is indicated at 112, and the center of gravity of the brass chips is indicated at 114. By putting the proper amount of brass chips in compartment A, which are compactible and may be heavier than the steel chips, it is convenient to substantially align the total centers of gravity of the load with the center of gravity 110 of the tank 20. Thus, for transport of the load, the springs 14 will be substantially equally loaded. It is to be noted that chips of this kind have a tendency further to be compacted during transportation due to normal vibration of the truck and tank.

In this example, and not in a restricting sense, it is preferred that the relatively least compacted material be dumped first even though it comprises the major portion of weight of the load. The relatively compacted mass (brass chips) will by engagement of the rear door 26, bottom 30, right side walls 34, partition 44, front wall 32, and in some cases the top 36, form a temporary beam of substantial cross-sectional area and hence torsional strength.

When the compartment B empties the springs 14 will be unloaded. Such unloading can be quite sudden if the chips have not been degreased prior to loading in the tank 20. The left-hand spring 14, FIG. 4, will be unloaded more than the right-hand spring. Consequently there will be a clockwise sudden or shock load applied to the tank 20 and its supports tending to rotate the tank and remaining contents in compartment A about their conjoint center of gravity. With low strength of parts and joints the tank would tend to yield to form a cross-sectional parallelogram. However, because of the reinforcement provided by the compacted material, such yielding is resisted. The mass will further tend to damp sudden movement. Thereafter the lighter weight compacted compartment A can be dumped at a relatively low level of stress on structural parts. It is also to be noted that even though the truck be moved after dumping the steel chips, and before dumping the brass chips, the eccentric load on the right-hand spring 14, FIG. 4, will not exceed one-half of the total tolerable load for both springs.

Figure 6:
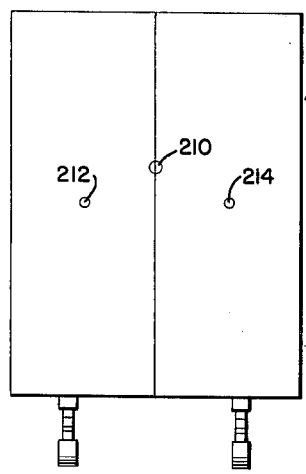
FIGS. 6 and 7 are diagrams to illustrate force factors in modifications of the invention.

FIG. 6 is a diagram of a double, substantially equally compartmented tank 120 having a tank center of gravity 210 and compartment centers of gravity 212 and 214. With such structure, because a substantially larger temporary beam can be formed by compactible material, and further because its center of gravity is nearer the centerline of the truck, the compacted material may best be dumped last, even though of greater weight than the less-compacted material.

Figure 7:
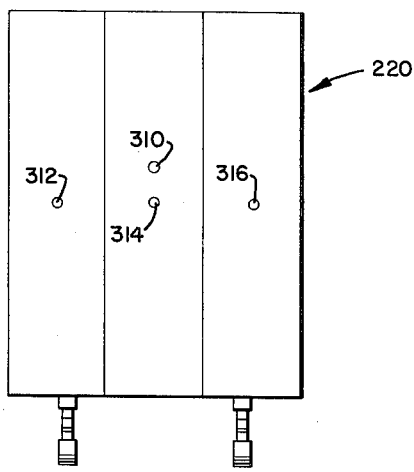

FIG. 7 is a diagram of a triple, substantially equally compartmented tank 220 having a tank center of gravity 310, and compartment centers of gravity 312, 314 and 316. This structure provides an extra grade of classification over the above-described machine, and greater inherent strength of tank. It is preferred that the center compartment contain the most compactible material and be dumped last.

Figure 8:
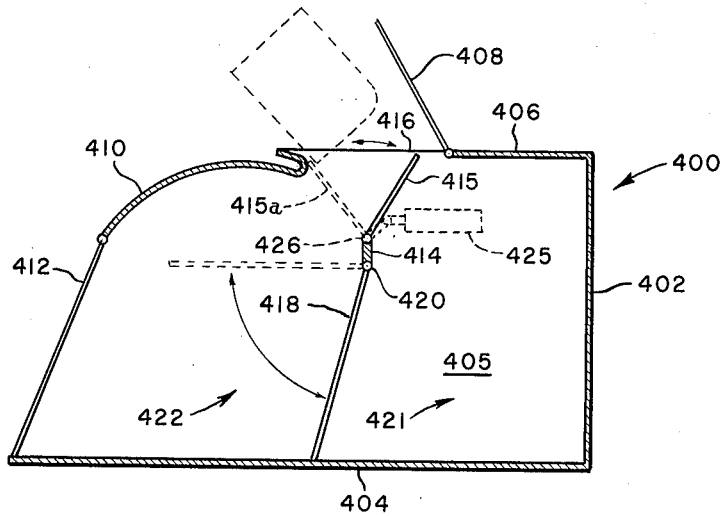
FIG. 8 is a diagrammatic sectional view of a transversely compartmented truck body.

FIG. 8 is a diagrammatic view taken just inside of a side wall of a truck body 400. The body 400 is shown as comprising a front wall 402, a bottom 404, at least two walls 405, only one of which is shown, and the section is taken to show the several doors in full lines and the structural members cross-hatched. A top wall 406 may mount a top closing door 408, and a curved rear top wall 410 may mount a rear closing door 412. A partition 414 extends between the sides and mounts one or more diverting plates 415 which can be swung between the full line position and the dotted line position 415a for diverting material to the forward part of the truck body adjacent the wall 402. With the diverted plate 415 in the position shown in full lines, the material dumped into the top opening 416 is diverted toward the rear of the truck. Without any other structure than this, material can be classified between the front and rear portions of the truck and the bottom may be provided with a well, not shown, so that liquid-containing materials would be diverted to the front portion of the truck over such well and dry material would be diverted rearwardly of the truck.

A door 418 is shown as mounted on a pivot 420 at the bottom of the partition 414. With such door 418 in closed position, there may be two sealed-apart compartments 421 and 422 defined thereby. Accordingly, when dumping, the door 418 may be held closed by a suitable latch means, not shown, while the rear door 412 is unlatched and the body may be tilted upwardly at its forward end to dump the rear compartment 422 by gravity. Thereafter, and at another location where the material is to be delivered, the forward compartment 421 may be dumped. With a single door 418, as shown, there will be but two classes of material. However, the wall 405 could represent a longitudinal partition in which case there can be more compartments to be filled and for serving the purpose of classifying as well as reducing stresses when the contents of the truck is dumped. Of course, with the transverse partition 414, diverting plate 415 and the door 418, eccentric stress on the truck structure is very substantially reduced over conventional trucks, and it also is reduced with respect to the modifications discussed hereinabove. The diverter plate 415 may be operated by a stroke motor 425 or manual means, or the like, attached to a driving bar 426 by suitable crank means indicated in dotted lines.

Figures 9, 10:
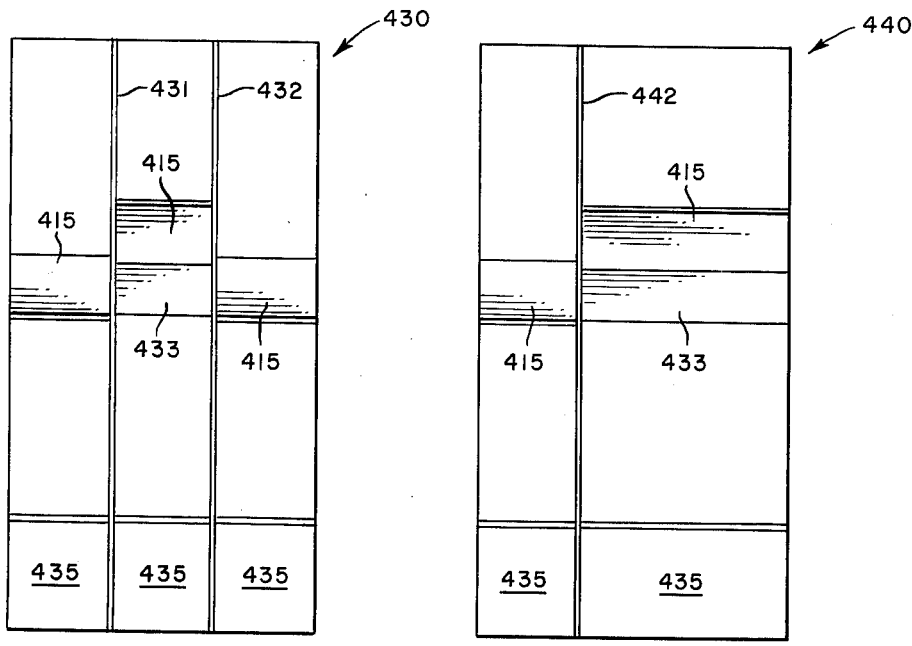
FIGS. 9 and 10 are diagrammatic views of longitudinally and transversely compartmented bodies.

FIG. 9 is a diagram of a truck body 430 with longitudinal partitions 431 and 432. If used without bottom doors 433 of which there may be one, two or three in number, only one being shown, the body may be divided into six classifying compartments. Rear doors 435 may all be identical in this modification and may be selectively opened with respect to each other for delivering the contents of the compartments to one or more classification depots, as desired.

FIG. 10 is a diagram of a truck body 440 having a single longitudinal partition 442 and transverse diverter plates 415 cooperable at their sides with the partition 442 and internal sides of the truck, for dividing the body into two to four compartments as determined by use of partition doors 433.

It is obvious that many uses and modifications other than those suggested will occur to those skilled in the art. Accordingly, I do not wish to be restricted to the machinery and method disclosed herein by way of example; but to be limited only by the scope of the following claims.

I claim:

1. Mechanism for receiving, transporting and emptying open topped portable containers comprising, in combination, a platform for receiving a plurality of containers, means for securing the containers upon said platform and preventing relative rotation of said platform and the containers, said securing means including a normally slack chain secured at one end to said platform, said chain carrying a container engaging hook at its other end, and spring means connected to spaced apart links of said chain whereby the containers are normally held against the platform but are subjected to limited movement and a sudden stop upon inversion of the platform, means for causing said platform and the containers to proceed along a predetermined path of travel, means for rotating said platform and containers to cause the open top of said containers to attain a position in which the contents thereof will exit therefrom due to the influence of gravity, and means for causing the contents of the containers to exit due to the additional influence of inertia.

2. A self-loading dump tank for transporting classifiable materials comprising a tank having a top loading opening, at least one partition in said tank forming at least two compartments therein beneath said loading opening for receiving the classifiable materials, at least two doors for closing said compartments and providing egress for the materials therein, elevating means including container means for holding at least two separated masses of material for selective gravitational loading into said two compartments, power-operated means for dumping the masses of material from said container means into said compartments, and means cooperable with said partition and said top loading opening for diverting the separated masses of material selectively between at least said two compartments, said diverting means being pivotally mounted on top of said partition, said partition being transverse of said tank for forming front and rear compartments, said partition having a lower edge spaced above a bottom wall of said tank, and a door pivotally mounted on the lower edge of said partition.

3. Mechanism for receiving, transporting and emptying open topped portable containers comprising, in combination, a platform for receiving a plurality of containers, means for securing the containers upon said platform and preventing relative rotation of said platform and the containers, said securing means including normally slack means secured at one end to said platform, said slack means carrying a container engaging hook at its other end, and tensioning means connected to said slack means for causing said hook to be tensioned whereby said containers are normally held against the platform but are subjected to limited movement and a sudden stop upon inversion of the platform, means for causing said platform and the containers to proceed along a predetermined path of travel, means for rotating said platform and containers to cause the open top of said containers to attain a position in which the contents whereof will exit therefrom due to the influence of gravity.

4. A truck having a walled tank and a top opening for receiving by gravity and retaining at least two kinds of classes of materials, said tank being tiltable relatively upward at the forward end and downward at the rear end thereof with relationship to the truck for expulsion of materials by gravity, at least one partition extending between walls of said tank forming and separating at least two compartments therein, at least two doors forming at least part of said two compartments in said tank, each said door being movable rearwardly with respect to said tank during expulsion of material from each said compartment structurally associated with each said door, power-operated means including material separating means for selectively loading said compartments with materials through the top opening of said tank, and means for driving said power-operated means from a loading position adjacent the rear of the truck through an arcuate path of travel to a dumping position adjacent the top of said tank.

5. A truck having a walled tank and including a top opening for receiving by gravity at least two kinds or classes of materials, said tank being tiltable relatively upward at the forward end and downward at the rear end thereof with relationship to the truck for expulsion of materials by gravity, at least one partition extending between walls of said tank forming and separating at least two compartments therein, at least two doors forming at least part of said two compartments in said tank, each said door being movable rearwardly with respect to said tank during expulsion of material from each said compartment structurally associated with each said door, power-driven means including material separating means for selectively loading said compartments with materials through the top opening of said tank by dumping the materials thereinto by gravity, and diverter means adjacent the top opening of said tank for directing material to different sides of said partition.

References Cited by the Examiner
UNITED STATES PATENTS

| | | | |
|---|---|---|---|
| Re. 24,959 | 3/61 | Trubinski | 214—518 |
| 732,459 | 6/03 | Stelter | 214—308 X |
| 1,492,675 | 5/24 | Clark et al. | 214—303 |
| 1,763,560 | 6/30 | Amendolara | 214—302 X |
| 2,101,067 | 12/37 | Howard | 214—303 X |
| 2,344,569 | 3/44 | Snyder | 298—8 |
| 2,908,410 | 10/59 | Glanz | 214—302 |
| 2,961,977 | 11/60 | Coleman | 214—82 X |
| 3,058,606 | 10/62 | Chalich et al. | 214—308 |
| 3,122,249 | 2/64 | Dempster et al. | 214—302 |

FOREIGN PATENTS

| | | |
|---|---|---|
| 1,079,666 | 4/60 | Germany. |
| 2,939 | 10/14 | Great Britain. |

GERALD M. FORLENZA, *Primary Examiner.*